United States Patent
Simmons et al.

(10) Patent No.: US 10,042,784 B2
(45) Date of Patent: Aug. 7, 2018

(54) SIDE CHANNEL ACCESS THROUGH USB STREAMS

(71) Applicant: Microchip Technology Incorporated, Chandler, AZ (US)

(72) Inventors: Michael Simmons, Chandler, AZ (US); Swaroop Adusumilli, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 287 days.

(21) Appl. No.: 14/880,699

(22) Filed: Oct. 12, 2015

(65) Prior Publication Data

US 2016/0103772 A1    Apr. 14, 2016

Related U.S. Application Data

(60) Provisional application No. 62/063,092, filed on Oct. 13, 2014.

(51) Int. Cl.
  *G06F 13/12* (2006.01)
  *G06F 13/42* (2006.01)
  (Continued)

(52) U.S. Cl.
  CPC .............. *G06F 13/12* (2013.01); *G06F 5/065* (2013.01); *G06F 13/362* (2013.01);
  (Continued)

(58) Field of Classification Search
  CPC .... G06F 13/12; G06F 13/385; G06F 13/4282; G06F 13/4022; G06F 2213/0042
  (Continued)

(56) References Cited

U.S. PATENT DOCUMENTS

| 5,675,813 A | 10/1997 | Holmdahl | 713/310 |
| 5,784,581 A | 7/1998 | Hannah | 710/110 |

(Continued)

FOREIGN PATENT DOCUMENTS

| GB | 2352540 A | 1/2001 | G06F 13/40 |
| JP | 2003256351 U | 9/2003 | G06F 13/14 |

(Continued)

OTHER PUBLICATIONS

International Search Report and Written Opinion, Application No. PCT/US2015/055213, 12 pages, dated Dec. 9, 2015.

(Continued)

*Primary Examiner* — Titus Wong
(74) *Attorney, Agent, or Firm* — Slayden Grubert Beard PLLC

(57) ABSTRACT

A system may provide side channel access of a Universal Serial Bus (USB) device using USB streams. The system may include a USB interface with a USB device controller, an internal bus, a logical unit number (LUN) arbiter coupled between the USB controller and the internal bus, and a secondary interface coupled with the LUN arbiter. The system may include a plurality of storage devices coupled to the internal bus. The system may provide access to the storage devices via both the USB device controller and the secondary interface. The LUN arbiter may accept a plurality of USB streams (e.g., storage device access requests) from the USB device controller and at least one additional USB stream (e.g., storage device access request) from the secondary interface. The LUN arbiter may determine a priority of access between USB streams originating from the USB device controller and the secondary interface.

9 Claims, 3 Drawing Sheets

(51) Int. Cl.
*G06F 13/38* (2006.01)
*G06F 5/06* (2006.01)
*G06F 13/362* (2006.01)

(52) U.S. Cl.
CPC ........ *G06F 13/385* (2013.01); *G06F 13/4282* (2013.01); *G06F 2205/067* (2013.01)

(58) Field of Classification Search
USPC ...................................................... 710/316
See application file for complete search history.

(56) References Cited

U.S. PATENT DOCUMENTS

| | | | | |
|---|---|---|---|---|
| 5,845,329 | A | 12/1998 | Onishi et al. | 711/157 |
| 6,119,190 | A | 9/2000 | Garney | 710/310 |
| 6,147,682 | A | 11/2000 | Kim | 345/211 |
| 6,205,501 | B1 | 3/2001 | Brief et al. | 710/100 |
| 6,266,715 | B1 * | 7/2001 | Loyer | G06F 13/28 |
| | | | | 709/212 |
| 6,308,239 | B1 | 10/2001 | Osakada et al. | 710/316 |
| 6,408,351 | B1 | 6/2002 | Hamdi et al. | 710/63 |
| 6,408,367 | B2 | 6/2002 | Achilles et al. | 711/157 |
| 6,516,205 | B1 | 2/2003 | Oguma | 455/557 |
| 6,532,512 | B1 | 3/2003 | Torii et al. | 710/316 |
| 6,549,966 | B1 | 4/2003 | Dickens | 710/300 |
| 6,601,109 | B1 | 7/2003 | Bealkowski et al. | 709/250 |
| 6,704,824 | B1 | 3/2004 | Goodman | 710/300 |
| 6,725,302 | B1 | 4/2004 | Benayoun et al. | 710/62 |
| 6,732,218 | B2 | 5/2004 | Overtoom et al. | 710/313 |
| 6,957,287 | B2 | 10/2005 | Lou et al. | 710/72 |
| 7,040,823 | B2 | 5/2006 | Silverbrook | 400/419 |
| 7,073,010 | B2 | 7/2006 | Chen et al. | 710/313 |
| 7,093,057 | B2 | 8/2006 | Choi | 710/313 |
| 7,246,189 | B2 | 7/2007 | Ulenas | 710/305 |
| 7,346,728 | B1 | 3/2008 | Jackson | 710/313 |
| 7,433,991 | B2 | 10/2008 | Fujita et al. | 710/316 |
| 7,478,191 | B2 | 1/2009 | Wurzburg et al. | 710/316 |
| 7,502,878 | B1 * | 3/2009 | Wright | G06F 13/4022 |
| | | | | 710/37 |
| 7,523,243 | B2 | 4/2009 | Bohm et al. | 710/305 |
| 7,627,708 | B2 | 12/2009 | Bohm et al. | 710/305 |
| 7,711,006 | B2 | 5/2010 | Dries et al. | 370/474 |
| 2005/0073792 | A1 * | 4/2005 | Bullock | H02H 9/005 |
| | | | | 361/118 |
| 2006/0056401 | A1 | 3/2006 | Bohm et al. | 370/360 |
| 2006/0059293 | A1 | 3/2006 | Wurzburg et al. | 710/313 |
| 2006/0227759 | A1 | 10/2006 | Bohm et al. | 370/351 |
| 2009/0013111 | A1 * | 1/2009 | Berland | G06F 13/4027 |
| | | | | 710/106 |
| 2009/0144477 | A1 * | 6/2009 | Chen | G06F 13/385 |
| | | | | 710/302 |
| 2010/0023669 | A1 | 1/2010 | Lee | 710/301 |
| 2010/0049878 | A1 * | 2/2010 | Yu | G06F 13/385 |
| | | | | 710/11 |
| 2013/0191568 | A1 * | 7/2013 | Hershko | G06F 13/4295 |
| | | | | 710/106 |

FOREIGN PATENT DOCUMENTS

| | | | | |
|---|---|---|---|---|
| JP | 2006085293 A | 3/2006 | | G06F 13/14 |
| JP | 2007293708 A | 11/2007 | | G06F 13/38 |
| WO | 2005/018124 A1 | 2/2005 | | H04J 3/24 |

OTHER PUBLICATIONS

Anonymous, "Universal Serial Bus Specification rv. 2.0," 650 pages, Apr. 27, 2000.
Anonymous, "On-the-Go Supplement to the USB 2.0 Specification, Rev. 1.0," 74 pages, Dec. 18, 2001.
Anonymous, "Microsoft Computer Dictionary, 5th Edition," 3 pages, 2002.
Hyde, John, "USB Design by Example: A Practical Guide to Building I/O Devices," Intel Press: Engineer to Engineer Communication, 30 pages, Apr. 2002.
Anonymous, "CY7C65640: Tetrallub™ High-Speed USB Hub Controller," Cypress Semiconductor Corporation, 25 pages, Dec. 5, 2002.
Axelson, Jan, "USB Complete: Everything you Need to Develop Custom USB Peripherals, Third Edition," Lakeview Research LLC, 560 Pages, 2005.
Excerpts of Prosecution File History of Abandoned U.S. Appl. No. 10/940,406, 289 Pages, Jan. 4, 2010.
Excerpts of Prosecution File History of Abandoned U.S. Appl. No. 11/100,299, 165 Pages, Jan. 4, 2010.
Excerpts of Prosecution File History of Abandoned U.S. Appl. No. 11/424,179, 190 Pages, Jan. 4, 2010.

* cited by examiner

SIDE CHANNEL ACCESS THROUGH USB STREAMS

RELATED PATENT APPLICATION

This application claims priority to commonly owned U.S. Provisional Patent Application No. 62/063,092 filed Oct. 13, 2014; which is hereby incorporated by reference herein for all purposes.

TECHNICAL FIELD

The present disclosure relates to systems and methods for use in a Universal Serial Bus (USB) environment, and more particularly, to improved systems and methods for side channel access of a USB device using USB streams.

BACKGROUND

USB environments are ubiquitous in modern electronics devices (e.g., servers, personal computers ("PCs"), tablet PCs, cell phones, automobile infotainment systems, personal gaming systems, toys, etc.). It is a "universal" interface that allows keyboards, monitors, printers, storage devices, cameras, phones, toys, games, and numerous other electronic devices to work on a single interface. With USB devices, particularly devices like card readers and similar, it is valuable to have a side channel into the device, using, for example, a separate interface, such as e.g. SPI, $I^2C$, UART, etc., from which the downstream USB resource, for example a media card in the case of a card reader, etc., can be accessed directly. One approach is to require that such access be done through the upstream USB port, but this may complicate the logic and/or compromise system performance.

For example, in a USB device (such as a dual card reader) that does not support USB streams, only one USB packet can be processed at a given time, and any further packets are held off until processing of the current packet is completed. This means that if a side channel transfer comes into the system through the upstream USB port, then all USB packets must be held off, even if the physical resource (e.g., a memory card) is not being accessed.

In a USB device that supports USB streams, the USB device controller will process N number of streams that come in sequentially. With USB streams, a new packet can be accepted into the device before the previous packet has been processed, up to the storage and processing capability of the device. This can be accomplished by having a central command arbiter that examines each USB packet and determines to which physical resource (e.g., memory card #1, memory card #2, CPU, etc.) that packet should be routed. By routing only to the physical resource that the packet is intended for, the logic in the physical resource can be simplified.

However, even with devices that support USB streams, a side channel access to one of the physical resources on the device will need to be processed by the CPU in order to determine the correct steering. On devices that do not support out-of-ordering processing of packets (which is most devices, as it is simpler not to support it), processing of all other packets must be held off until the side channel packet is correctly steered, so that the order of all packets is maintained. This requires communication and synchronization between the side channel logic and the USB device controller, which may be complicated to implement correctly.

Further, requiring the side channel access through the upstream USB port may not be acceptable to some users that either have to use (or want to use) a separate interface, such as SPI, $I^2C$, UART, etc. to access the USB device. Allowing side channel access to the USB device via one of these separate interfaces can complicate the hardware and associated software routines. For example, implementing the functionality to multiplex read and write commands/data on such a side channel with the read and write commands on the USB upstream can be complicated to implement and often would result in a proprietary command and addressing scheme and/or additional hardware requirements (e.g., an additional arbiter layer that determines access priority as between commands originating from the USB host and commands originating via the separate SPI/$I^2C$/UART/etc. interface).

SUMMARY

Therefore, a need exists for an improved USB environment that can provide efficient and simple side channel access that avoids the aforementioned complications.

According to an embodiment, a system is provided which may include a USB interface with a USB device controller and buffer memory. The system may further include an internal bus and a logical unit number (LUN) arbiter coupled between the USB device controller and the internal bus. The system may further include a secondary interface coupled with the LUN arbiter. In certain embodiments, the system may include a FIFO coupled between the secondary interface and the internal bus. In the same or alternative embodiments, the system may include a plurality of storage devices coupled to the internal bus, and each storage device may include a Small Computer System Interface (SCSI) command processing unit and a memory card controller. In the same or alternative embodiments, the system may include a plurality of endpoints coupled between the USB device controller and the LUN arbiter. In the same or alternative embodiments, the USB device controller may support USB streams and the LUN arbiter may be a USB stream arbiter. In the same or alternative embodiments, the LUN arbiter may be configured to accept a plurality of USB streams from the USB device controller and at least one additional USB stream from the secondary interface.

According to a further embodiment, a method is provided for providing side channel access to a first hardware resource in a system having a plurality of hardware resources, a USB device controller that supports USB streams, a logical unit number (LUN) arbiter, and a secondary interface. The USB device controller may receive a USB request to access the first hardware resource of the plurality of hardware resources. The secondary interface may receive a side channel request to access the first hardware resource of the plurality of hardware resources. The USB device controller may forward the USB request to the LUN arbiter, and the secondary interface may forward the side channel request to the LUN arbiter. The LUN arbiter may determine the order in which the USB request and the side channel request are forwarded to the first hardware resource.

According to a further embodiment, a system is provided which may include a USB device controller, an internal bus, and a side channel interface unit. The system may further include a logical unit number (LUN) arbiter coupled between (i) the USB device controller and the internal bus and (ii) the side channel interface unit and the internal bus. The system may further include at least one hardware controller coupled to the internal bus. The system may further include at least one processor. The at least one processor may be configured to generate first and second USB packets for accessing the at least one hardware controller. The at least one processor may be further configured to transmit the first USB packet to the USB device controller via a USB interface, and to transmit the second USB packet to the side channel interface unit by tunneling the second USB packet over a side channel interface communications protocol. Upon receiving the first USB packet, the USB device controller may forward the first USB packet to the LUN arbiter as a first USB stream. Upon receiving the second USB packet, the side channel interface unit may forward the second USB packet to the LUN arbiter as a second USB stream. The LUN arbiter may determine an access priority between the first and second USB streams. The at least one hardware controller may be accessed in response to the first and second USB packets.

BRIEF DESCRIPTION OF THE DRAWINGS

A more complete understanding of the present disclosure may be acquired by referring to the following description taken in conjunction with the accompanying drawings wherein.

Figure 1:
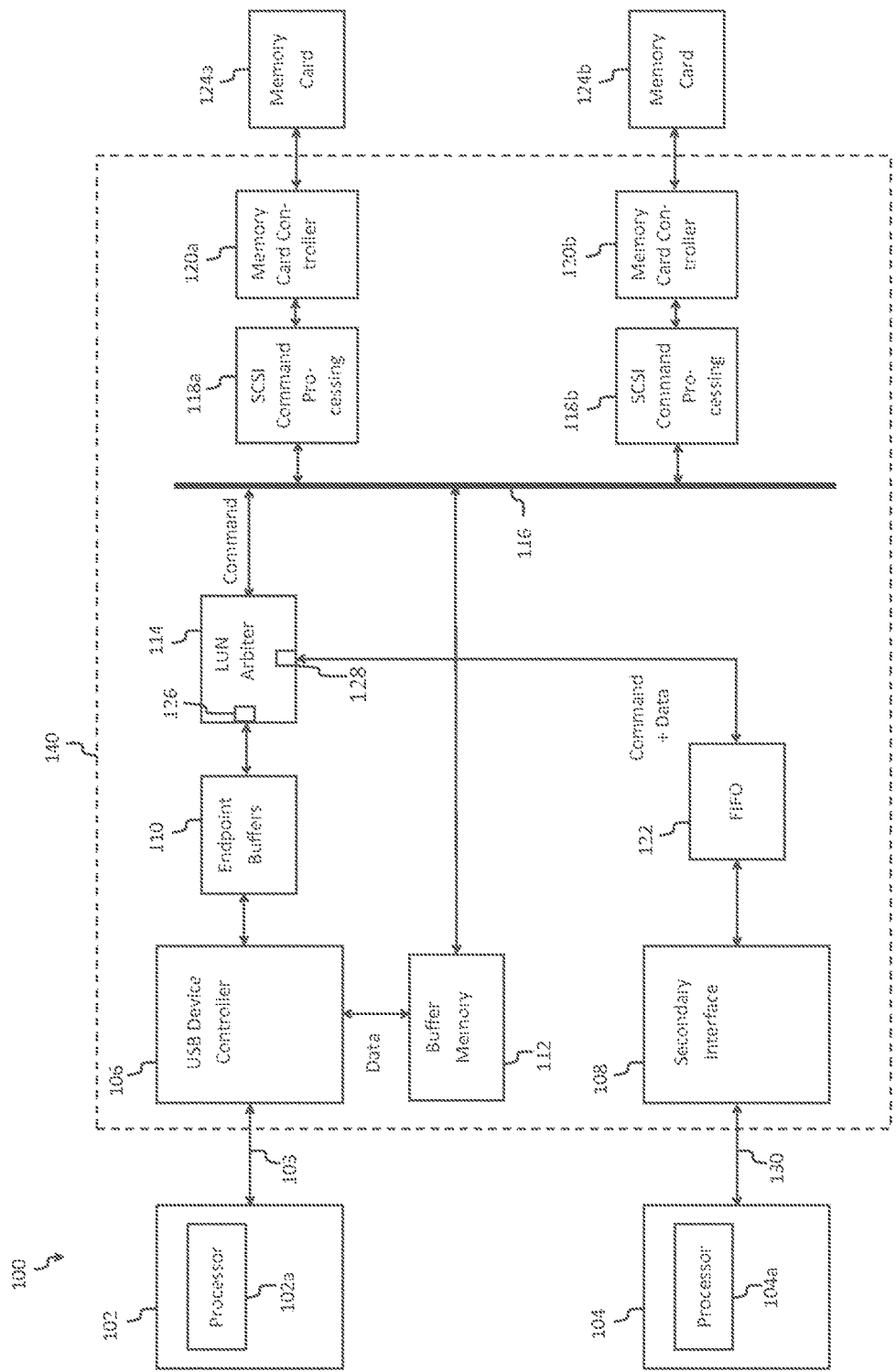
FIG. 1 illustrates a block diagram of an example system that can provide side channel access of a USB device using USB streams, in accordance with certain embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a system that can provide enhanced side channel access of a USB device using USB streams can be provided.

Referring now to the drawings, the details of example embodiments are schematically illustrated. Like elements in the drawings will be represented by like numbers, and similar elements will be represented by like numbers with a different lower case letter suffix.

FIG. 1 illustrates a block diagram of an example system that can provide enhanced side channel access of a USB device using USB streams, in accordance with certain embodiments of the present disclosure. As depicted in FIG. 1, system 100 may comprise hardware units 102 and 104, having processors 102a and 104a, respectively. System 100 may further comprise USB device controller 106 coupled to endpoint buffers 110 and buffer memory 112. System 100 may further include secondary interface 108 coupled to FIFO 122. System 100 may further comprise logical unit (LUN) arbiter 114 having upstream ports 126 and 128, and coupled to internal bus 116 via a downstream port. System 100 may further comprise Small Computer System Interface (SCSI) command processing units 118a and 118b and memory card controllers 120a and 120b for accessing memory cards 124a and 124b, respectively. Bus 103 may couple hardware unit 102 with USB device controller 106, and may be capable of carrying USB-compliant signaling between hardware unit 102 and USB device controller 106. Bus 130 may couple hardware unit 104 with secondary interface 108, and may be capable of carrying signaling corresponding to a protocol supported by secondary interface 108. FIG. 1 depicts hardware unit 140, indicating that it may be a separate hardware (e.g., different physical chips, boards, etc.) from hardware units 102 and 104. This depicted hardware delineation is, however, merely exemplary. Different embodiments (e.g., FIG. 2, described below) may provide for different hardware configurations. Further, while the embodiment depicted in FIG. 1 includes two physical memory cards (124a/b) and corresponding memory card controllers (120a/b) and SCSI command processing units (118a/b), alternative embodiments may include any number of memory cards (e.g., 2, 3, 10, 16, etc.) and associated SCSI command processing units.

Processors 102a and 104a may comprise any system, device, or apparatus operable to interpret and/or execute program instructions and/or process data, and may include, without limitation, a microprocessor, microcontroller, digital signal processor, application specific integrated circuit (ASIC), or any other digital or analog circuitry configured to interpret and/or execute program instructions and/or process data. Processor 102a of hardware unit 102 may be communicatively coupled to USB device controller 106 to provide signaling appropriate to implement/control a USB device. Processor 104a of hardware unit 104 may be communicatively coupled to secondary interface 108 to provide signaling appropriate to implement/control the secondary interface (e.g., SPI/I²C/UART/etc.). Processors 102a and 104a may also be communicatively coupled to other resources (not shown), including memory (e.g., volatile, non-volatile, etc.), storage media (e.g., flash, EEPROM, solid state storage media, etc.), etc.

USB device controller 106 may comprise any system, device, or apparatus operable to implement a USB device controller interface, and may include, without limitation, an application specific integrated circuit (ASIC) or any other digital or analog circuitry (and necessary software/firmware) configured to implement a USB device controller interface. In certain embodiments, USB device controller 106 may be a device controller provided by Microchip Technology, Inc. (Microchip). USB device controller 106 may support USB streams (e.g., as introduced in version 3.0 of the USB specification). USB device controller 106 may be coupled to endpoint buffers 110 and buffer memory 112. Endpoint buffers 110 may comprise any number of endpoints, up to the maximum allowed by the USB specification. Endpoint buffers 110 may be used to store USB commands while buffer memory 112 may be used to store data related to USB transactions handled by USB device controller 106.

Secondary interface 108 may comprise any system, device, or apparatus operable to implement a secondary interface, and may include, without limitation, an application specific integrated circuit (ASIC) or any other digital or analog circuitry (and necessary software/firmware) configured to implement a secondary interface. Secondary interface 108 may be a Serial Peripheral Interface (SPI), an Inter-Integrated Circuit (I²C) interface, a Universal asynchronous receiver/transmitter (UART) interface, or any other non-USB communications interface suitable for implementing a side channel access interface. Secondary interface 108 may be coupled to FIFO 122. FIFO 122 may be used to store USB commands and data related to side channel access USB transactions handled by secondary interface 108.

Logical unit number (LUN) arbiter 114 may comprise any system, device, or apparatus operable to implement a USB stream arbiter, and may include, without limitation, an application specific integrated circuit (ASIC) or any other digital or analog circuitry (and necessary software/firmware) configured to implement a USB stream arbiter. LUN arbiter 114 may include upstream ports 126 and 128 coupled to endpoint buffers 110 and FIFO 122, respectively. LUN arbiter 114 may support, via upstream port 126, a plurality of USB streams originating from USB device controller 106. LUN arbiter 114 may further support, via upstream port 128, at least one additional USB stream originating from secondary interface 108. A LUN is a unique identifier used to differentiate separate devices (each of which is a logical unit) as addressed by a SCSI, iSCSI, or Fibre Channel (FC) protocol.

SCSI command processing units 118a and 118b may comprise any system, device, or apparatus operable to process SCSI commands issued on internal bus 116, and may include, without limitation, an application specific integrated circuit (ASIC) or any other digital or analog circuitry (and necessary software/firmware) configured to process SCSI commands issued on internal bus 116. In alternative embodiments, internal bus 116 may be an iSCSI, FC, or any other bus suitable to interface between the LUN arbiter and the memory card controllers 120a and 120b. Accordingly, while FIG. 1 depicts elements 118a and 118b as SCSI command processing units, these processing units may be iSCSI, FC, or other command processing units in alternative embodiments.

Memory card controllers 120a and 120b may comprise any system, device, or apparatus operable to control memory cards 124a and 124b, respectively, and may include, without limitation, an application specific integrated circuit (ASIC) or any other digital or analog circuitry (and necessary software/firmware) configured to control memory cards 124a and 124b. In alternative embodiments, memory cards 124a and 124b may be hardware resources other than a memory card (e.g., audio devices, etc.). Accordingly, while FIG. 1 depicts elements 120a and 120b as memory card controllers, these controllers may be configured to control hardware resources other than memory cards (e.g., audio devices, etc.).

In operation, system 100 may provide enhanced side channel access to a USB device using USB streams. Hardware unit 102 and processor 102a may execute software and/or firmware generally operable to interact with USB device controller 106 via USB bus 103 (e.g., a USB host controller stack, etc.). Upon receiving USB packets via USB bus 103, USB device controller 106 may forward (e.g., store) corresponding USB commands comprising USB streams to endpoint buffers 110 and may store corresponding data in buffer memory 112.

At any time, hardware unit 104 and processor 104a may execute software and/or firmware generally operable to initiate a side channel access of the USB device by transmitting data to secondary interface 108 via bus 130. As disclosed previously, bus 130 may be an SPI bus, an I²C bus, a UART bus, or any other non-USB bus suitable for implementing a side channel access interface. Hardware unit 104 and processor 104a may send a USB packet over bus 130 by tunneling the USB packet over the secondary interface protocol. In other words, a USB protocol may be overlaid on top of a SPI/I²C/UART/etc. protocol, which is counter-intuitive when not bridging USB to SPI/I²C/UART/etc. In effect, the reverse bridging function is done, which may be considered a very odd thing to do, as USB is considered the more capable and robust protocol to use. Upon receiving USB packets via bus 130, secondary interface 108 unpacks the USB packets and forwards (e.g., stores) the USB commands and data as USB streams in FIFO 122.

LUN arbiter 114 may receive USB packets via USB streams at upstream ports 126 (from USB device controller 106) and 128 (from secondary interface 108). LUN arbiter 114 may steer USB packets received at upstream ports 126 and 128 to the correct on-chip resource by determining which physical LUNs (e.g., memory card controllers 120a and 120b in FIG. 1) the packet is destined for and directing the request contained in the USB packet to the correct LUN. Accordingly, LUN arbiter 114 may convert the request contained in a USB packet to a command (e.g., a unicast command) according to a SCSI, iSCSI, or Fibre Channel (FC) protocol, and may forward the converted request to internal bus 116.

SCSI command processing units 118a and 118b may receive commands from internal bus 116 and interface with memory card controllers 120a and 120b, respectively, (or other hardware controllers) to cause an access to memory cards 124a and 124b (or other hardware resources). The access of memory cards 124a and 124b may be as a regular USB access (i.e., via USB device controller 106) or as a side channel access (i.e., via secondary interface 108).

Figure 2:
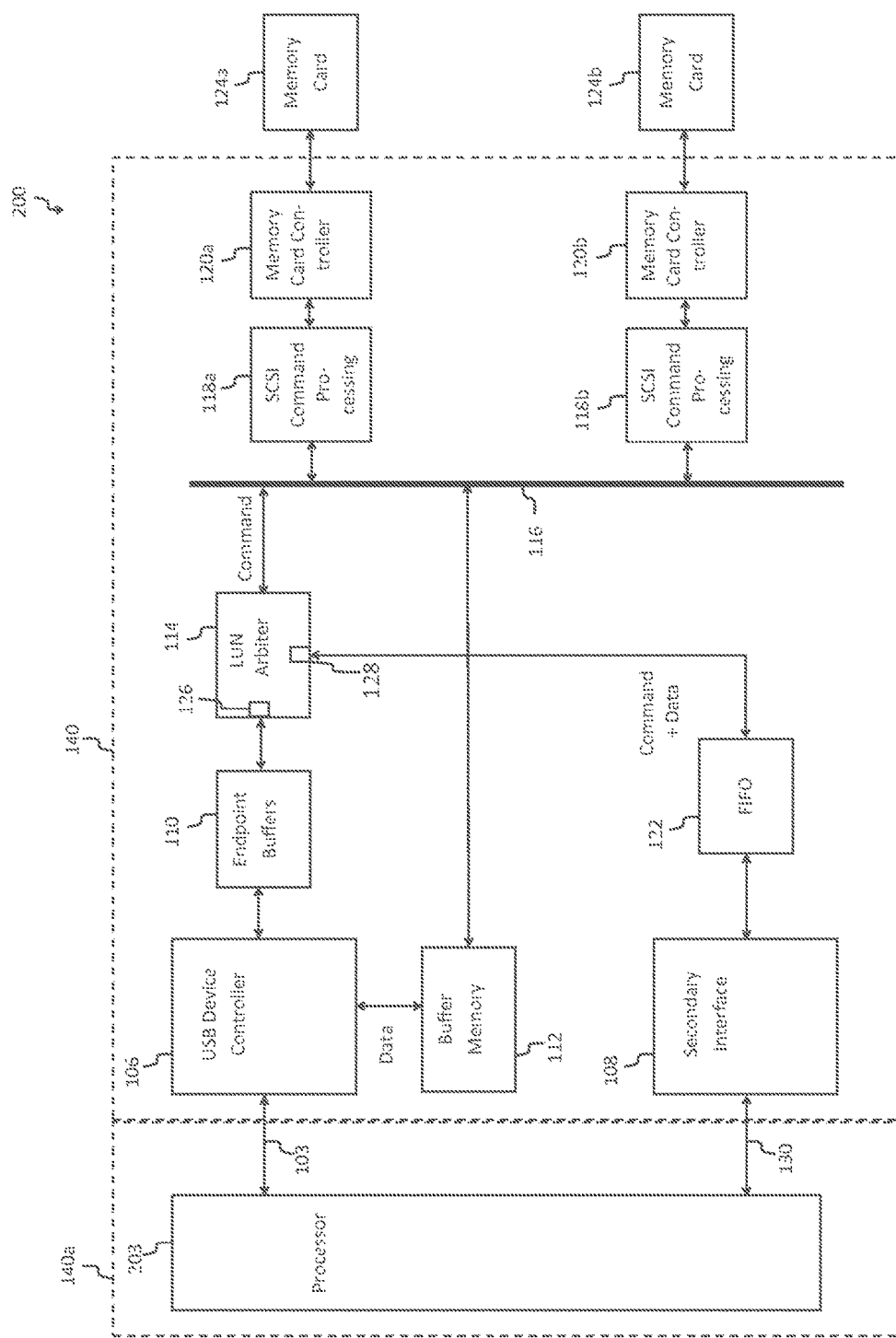
FIG. 2 illustrates a block diagram of an example system that can provide side channel access of a USB device using USB streams, in accordance with certain embodiments of the present disclosure.

FIG. 2 illustrates a block diagram of an example system that can provide enhanced side channel access to a USB device using USB streams, in accordance with certain embodiments of the present disclosure. FIG. 2 is, in nearly all respects, identical to FIG. 1. FIG. 2 depicts an alternative embodiment in which processor 203 replaces the hardware units 102 and 104 of FIG. 1. The embodiment of FIG. 2 also differs from FIG. 1 by the addition of element 140a.

According to the embodiment depicted in FIG. 2, processor 203 may comprise any system, device, or apparatus operable to interpret and/or execute program instructions and/or process data, and may include, without limitation, a microprocessor, microcontroller, digital signal processor, application specific integrated circuit (ASIC), or any other digital or analog circuitry configured to interpret and/or execute program instructions and/or process data. Processor 203 may be communicatively coupled to USB device controller 106 to provide signaling appropriate to implement/control a USB device. Processor 203 may further be communicatively coupled to secondary interface 108 to provide signaling appropriate to implement/control the secondary interface. Processor 203 may also be communicatively coupled to other resources (not shown), including memory (e.g., volatile, non-volatile, etc.), storage media (e.g., flash, EEPROM, solid state storage media, etc.), etc. Thus, while processors 102a and 104a of FIG. 1 were part of separate hardware units, processor 203 in FIG. 2 initiates both the normal USB accesses and the side channel accesses.

Element 140a of FIG. 2 represents various alternative embodiments according to this disclosure. For example, in one embodiment, processor 203 may be a part of hardware unit 140. In alternative embodiments, processor 203 may be part of a hardware unit that is separate from hardware unit 140.

Figure 3:
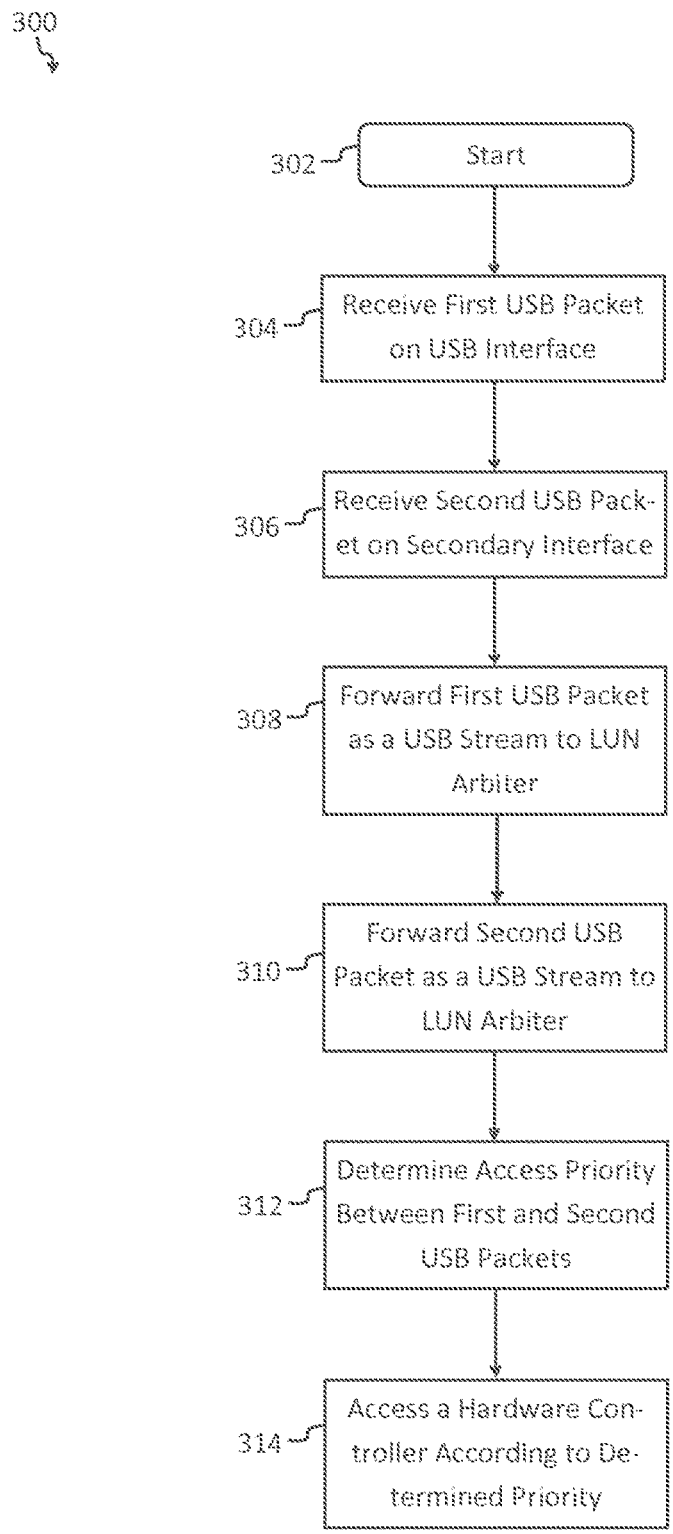
FIG. 3 illustrates a flow chart of an example method for providing side channel access of a USB device using USB streams, in accordance with certain embodiments of the present disclosure.

FIG. 3 illustrates a flow chart of an example method 300 for providing enhanced side channel access of a USB device using USB streams, in accordance with certain embodiments of the present disclosure. According to one embodiment, method 300 preferably begins at step 302. As noted above, teachings of the present disclosure may be implemented in a variety of configurations of systems 100/200. As such, the preferred initialization point for method 300 and the order of the steps 302-314 comprising method 300 may depend on the implementation chosen.

At step 302, systems 100/200 may initialize. For example, systems 100/200 may be powered on (via power source or connection to USB host), and USB device controller 106, secondary interface 108, and other components of systems 100/200 may initialize. At step 304, systems 100/200 may receive a first USB packet via USB bus 103. The first USB packet may represent normal USB traffic sent from a USB host in hardware unit 102. At step 306, systems 100/200 may receive a second USB packet on secondary interface 108. The second USB packet may be received according to the communication protocol defined by the secondary interface (e.g., tunneling the USB packet over a SPI/I²C/UART/etc. interface). At step 308, the USB device controller may forward the first USB packet to the LUN arbiter 114 as a USB stream. At step 310, the secondary interface 108 may forward the second USB packet to the LUN arbiter 114 as a USB stream (i.e., the secondary interface may unpack the tunneled second USB packet in order to forward it to the LUN arbiter 114 via FIFO 122). At step 312, the LUN arbiter 114 may determine the priority of access between the first and second USB packets. In this context, if LUN arbiter 114 determines that the first and second packets are directed to different hardware resources, LUN arbiter 114 may determine that there is no contention between the requests contained in the first and second packets. At step 314, the LUN arbiter 114 may access hardware controllers 120a and/or 120b according to the priority determined for the first and second USB packets. For example, LUN arbiter 114 may issue commands on internal bus 116 that may be processed by command processing blocks 118a/118b. In turn, hardware controllers 120a and/or 120b may be accessed, resulting in access to memory card 124a and/or 124b.

Although FIG. 3 discloses a particular number of steps to be taken with respect to the methods depicted therein, that method may be executed with greater or fewer steps than depicted. In addition, although FIG. 3 discloses a certain order of steps to be taken with respect to the methods depicted there, the steps may be completed in any suitable order. For example, step 304 may occur after step 306. As another example, step 308 may occur after step 310.

Using the methods and systems disclosed herein, a system that can provide enhanced side channel access of a USB device using USB streams can be provided. According to the disclosed embodiments, users may advantageously use existing hardware interfaces to perform a side channel access of a USB device. A side channel master (e.g., SPI, I²C, UART, etc. master) may speak like a USB host to any kind of USB downstream device which may be put onto the chip. Furthermore, according to the disclosed embodiments, a CPU residing on system 140 may be relieved of the burden of processing all side channel packets. Further, according to the disclosed embodiments, arbitration becomes centralized and therefore simpler and more consistent. For example, LUN arbiter 114 need only process USB packets, which may simplify the design and remove the need for proprietary protocols. As another example, in some embodiments, LUN arbiter 114 need only support one additional USB stream related to the side channel access, a simple modification to pre-existing USB stream arbiters. Still further, the disclosed embodiments will allow coherent out-of-order processing for side channel accesses.

Although the present disclosure has been described in detail, it should be understood that various changes, substitutions, and alterations can be made hereto without departing from the spirit and the scope of the disclosure as defined by the appended claims.

What is claimed is:

1. A system comprising:
a USB device controller;
an internal bus;
a side channel interface unit;
a logical unit number (LUN) arbiter coupled between (i) the USB device controller and the internal bus and (ii) the side channel interface unit and the internal bus;
at least one hardware controller coupled to the internal bus; and
at least one processor configured to:
generate first and second USB packets for accessing the at least one hardware controller;
transmit the first USB packet to the USB device controller via a USB interface; and
transmit the second USB packet to the side channel interface unit by tunneling the second USB packet over a side channel interface communication protocol;
wherein the USB device controller forwards the first USB packet to the LUN arbiter as a first USB stream, the side channel interface unit forwards the second USB packet to the LUN arbiter as a second USB stream, and the LUN arbiter determines an access priority between the first and second USB streams.

2. The system according to claim 1, wherein the at least one hardware controller is accessed in response to the first and second USB packets.

3. The system according to claim 1, wherein the at least one hardware controller is a memory card controller.

4. The system according to claim 1, wherein the internal bus is a Small Computer System Interface (SCSI) bus and the at least one hardware controller is coupled to the internal bus via a SCSI command processing unit.

5. The system according to claim 1, wherein the side channel interface communication protocol is one of: a Serial Peripheral Interface (SPI) protocol, an Inter-Integrated Circuit (I2C) interface protocol, or a Universal asynchronous receiver/transmitter (UART) interface protocol.

6. The system according to claim 1, wherein the side channel interface unit forwards the second USB packet to the LUN arbiter using a FIFO.

7. The system according to claim 1, wherein the LUN arbiter is configured to accept a plurality of USB streams from the USB device controller and at least one additional stream from the side channel interface unit.

8. The system according to claim 1, wherein the first USB packet is generated by a first processor of the at least one processors, and the second USB packet is generated by a second processor of the at least one processors.

9. The system according to claim 8, wherein the first processor is part of a first hardware unit, the second processor is part of a second hardware unit, and the USB device controller is part of a third hardware unit.

* * * * *